Patented July 12, 1932

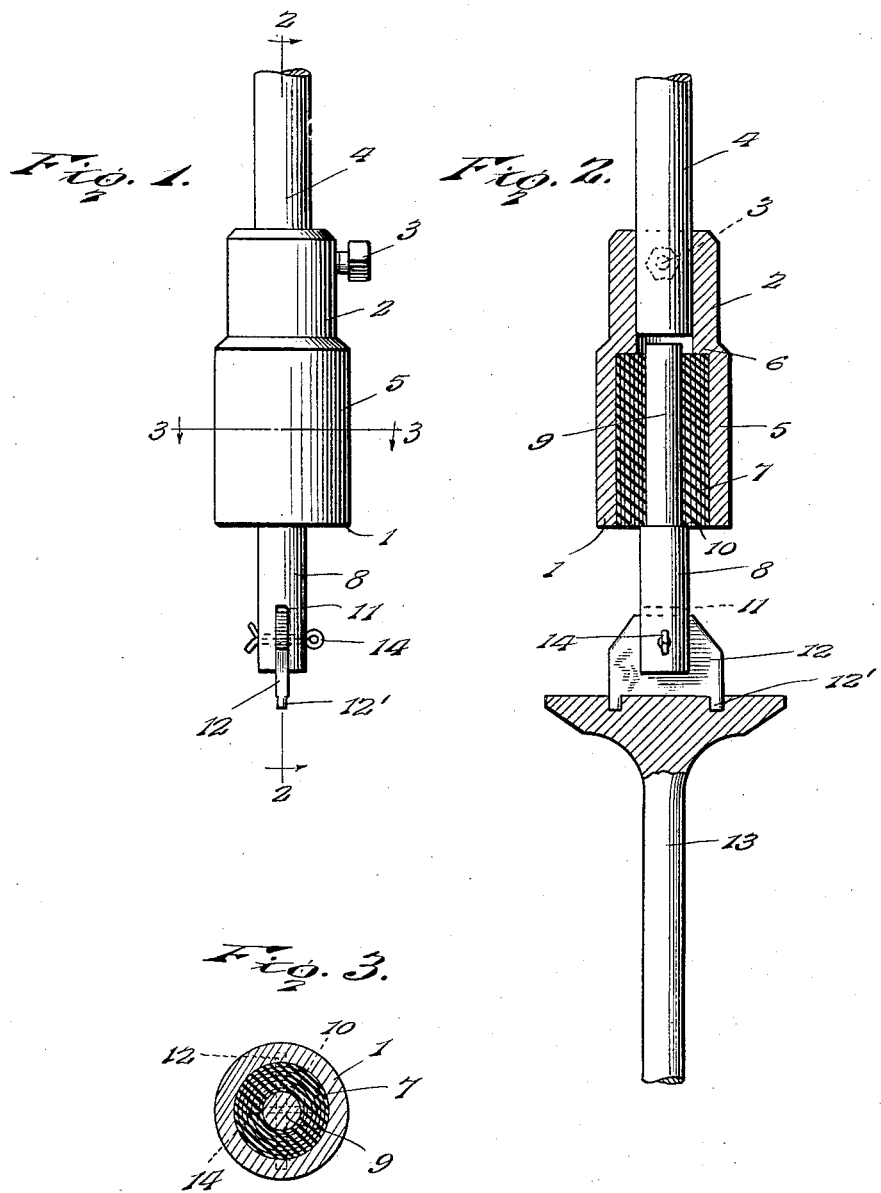

1,867,484

UNITED STATES PATENT OFFICE

JOHN H. WOLFE AND CHARLES S. WOLFE, OF PUNXSUTAWNEY, PENNSYLVANIA

FLEXIBLE COUPLING

Application filed February 5, 1930. Serial No. 426,142.

This invention relates to improvements in flexible couplings and more particularly to an improved shaft coupling for use in conjunction with manually, electrically, or pneumatically driven valve grinding machines.

It is well kown that, in order to grind a valve seat uniformly, it is important that vibration of the shaft of the grinder be entirely eliminated, otherwise such vibration would cause an uneven seat to be formed which would, of course, be detrimental to the proper functioning of the valve.

One object of the present invention, is therefore, to provide a coupling which will effectually prevent vibration of the shaft of the grinding machine from being transmitted to the valve being ground.

Another object of the invention is to provide a device of this character which will not interfere with the proper functioning of the grinding machine.

A further object of the invention is to provide a coupling which will require no further attention after installation.

Still further objects of the invention not specifically mentioned in the foregoing will appear during the course of the following description.

In the drawing:

Figure 1 is a side elevation of the device.

Figure 2 is a vertical sectional view of the device on the line 2—2 of Figure 1, looking in the direction indicated by the arrows.

Figure 3 is a horizontal sectional view of the device on the line 3—3 of Figure 1, looking in the direction indicated by the arrows.

The improved shaft coupling forming the subject matter of the present invention comprises a substantially cylindrical tubular body 1 which is formed preferably of steel. The body is reduced near one end to provide a hollow shank 2 having a relatively thick wall and screwed into the wall of the shank near its free end is a set screw 3. The shank is intended to accommodate one end portion of the shaft 4 of a grinding machine such, for instance, as an electric or pneumatic machine, and, of course, the set screw 3 is adjusted to engage the shaft for rigidly connecting the coupling thereto. It is to be observed, of course, that the shank may be bored to accommodate shafts of various sizes and shapes. As seen more clearly in Figure 2 of the drawing, the unreduced portion of the body is recessed throughout its length to thus increase the size of the bore thereof so that a relatively thin side wall 5 for said portion is defined. A flat annular shoulder 6 is thus formed at the junction of the unreduced portion and the shank.

Tightly fitting within the unreduced portion of the body and abutting the shoulder 6 is a bushing 7. Connected with the body by the bushing is a stem 8 having a reduced portion 9 extending axially of the bushing and defining a flat annular shoulder 10 which abuts the outer end of the bushing. The reduced portion is tightly embedded within the bushing with the shoulder 10 abutting the outer end face of said bushing, said shoulder 10 preventing the stem from creeping upwardly through the bushing and into engagement with the shaft 4 of the grinding machine. This bushing 7 is preferably laminated, being formed of superposed plies of rubber and appropriate fabric. However, at the exterior of the bushing is a preferably rubber coating to contact the wall 5 of the body, while axially of the bushing is a relatively thick rubber core to receive and tightly grip the reduced portion 9 of the stem. At its outer end portion the stem is provided with a slot 11 and removably carried in the slot is an appropriate bit 12, the bit shown having lugs 12' to engage the head of a valve conventionally indicated at 13. Extending through the slotted end portion of the stem and the bit is a cotter key 14 for retaining said bit in position. It is to be understood, of course, that various types of valve head engaging bits may be employed in conjunction with the stem.

In practice, the device is placed upon the end portion of the shaft 4 of the valve grinding machine and secured in position by tightening the set screw 3. It is to be emphasized that the end portion of the shaft 4 is not to be placed in contact with the inner end portion of the stem as such engagement would rob the bushing of its function and defeat the purpose of the invention. When the device is in operative position and the shaft 4 is rotated, the valve 13 will of course, be turned to effect the grinding of the valve and, as the stem 8 is cushioned by the bushing, said bushing will absorb the vibration of the power unit and prevent such vibration from reaching the valve head through the stem. Therefore, a uniform valve seat may be ground.

What is claimed is:

1. A device of the class described including, in combination with a valve grinding machine having a shaft, a body having a recess defining a shoulder and reduced at one end portion to define a shank accommodating the shaft, a cushioning bushing carried in the recess and abutting the shoulder, a stem having a reduced portion defining a shoulder, said reduced portion being embedded in the bushing with said second mentioned shoulder abutting said bushing whereby the stem will be limited against creeping into the body toward the shaft, and valve head engaging means carried by the stem.

2. A flexible coupling including a cylindrical body having an unreduced portion and a reduced relatively thick upper portion forming a hollow shank to receive a shaft, the unreduced portion being formed with an axial recess defining a relatively thin side wall and a flat shoulder at the junction of the two walls, a resilient bushing seated in the recess and abutting the shoulder, and a stem carried by the bushing, said stem having a reduced portion embedded in the bushing and a shoulder abutting the outer end face of said bushing and preventing inward creeping of the stem toward the shaft.

In testimony whereof we affix our signatures.

JOHN H. WOLFE. [L. S.]
CHARLES S. WOLFE. [L. S.]